United States Patent [19]

Rode

[11] 4,239,295
[45] Dec. 16, 1980

[54] CIRCUIT FOR PREVENTING THE WHEEL VELOCITY FROM EXCEEDING THE VEHICLE VELOCITY IN VEHICLES WITH ANTILOCKING BRAKE SYSTEMS

[75] Inventor: Konrad Rode, Hanover, Fed. Rep. of Germany

[73] Assignee: WABCO Fahrzeugbremsen GmbH, Hanover, Fed. Rep. of Germany

[21] Appl. No.: 937,661

[22] Filed: Aug. 28, 1978

[30] Foreign Application Priority Data

Sep. 8, 1977 [DE] Fed. Rep. of Germany ....... 2740419

[51] Int. Cl.$^3$ .............................................. B60T 8/08
[52] U.S. Cl. .................... 303/106; 303/108; 303/110
[58] Field of Search ............... 303/108, 110, 106, 20, 303/105, 104, 107, 109

[56] References Cited

U.S. PATENT DOCUMENTS

| 3,764,817 | 10/1973 | Nakamura | 303/20 |
| 3,948,570 | 4/1976 | Fukumori | 303/106 |

Primary Examiner—Reinhard J. Eisenzopf
Attorney, Agent, or Firm—J. B. Sotak; R. W. McIntire, Jr.

[57] ABSTRACT

A switching circuit for preventing the velocity of the rotating wheels from exceeding the velocity of the moving vehicle in an anti-skid vehicular braking system. The switching circuit includes a first threshold device for generating deceleration and acceleration control signals and a second threshold device for generating positive and negative slip control signals. A logic circuit for evaluating the control signals and controlling the brake pressure and switching devices being activated by a positive slip control signal for blocking the first threshold device from generating the deceleration and acceleration signals and which blocking can be eliminated by the presence of a negative slip control signal.

2 Claims, 2 Drawing Figures

CIRCUIT FOR PREVENTING THE WHEEL VELOCITY FROM EXCEEDING THE VEHICLE VELOCITY IN VEHICLES WITH ANTILOCKING BRAKE SYSTEMS

FIELD OF THE INVENTION

This invention relates to a new and improved switching circuit arrangement for preventing the vehicle wheel velocity from exceeding the vehicle velocity in vehicles provided with anti-skid brake systems with threshold stages for generating deceleration and acceleration control signals and positive and negative slip control signals and with a logic circuit that evaluates the control signals for the brake pressure control.

BACKGROUND OF THE INVENTION

In the case of a combined hydraulic and pneumatic type of vehicle brake system, there is a possibility that when the vehicle wheels start rapidly again after a braking action is initiated in an anti-skid vehicle brake system, the wheel velocity will normally exceed the vehicle velocity. Such a case will generally occur every time during fast restarting of the vehicle wheels with acceleration values greater than 5 g. If the difference in velocities is great enough to set the deceleration stage for generation of the delay control signals, there is a risk of too early a drop in the brake pressure and hence, the reference velocity stage is set too early, i.e., the reference velocity runs out too soon, which involves the danger of underbraking the vehicle.

OBJECTS OF THE INVENTION

Therefore, it is an object of the present invention to provide and design a circuit arrangement in such a way that an overshooting of the wheel velocity beyond the vehicle velocity is prevented and the run-away of the reference velocity over the vehicle velocity is avoided at the same time.

It is another object of this invention to solve the above-described problem by providing a unique circuit that is activated by a positive slip control signal which blocks the threshold stages for generating the deceleration and acceleration control signals whose blocking can be eliminated by a negative slip signal.

A further object of this invention is to provide a new and improved circuit initiating brake pressure control wherein unduely high overshooting of the wheel velocity over the vehicle velocity is avoided, and wherein the reference velocity is also prevented from running away from the vehicle velocity. In this way, the underbraking of the vehicle is prevented and more stable handling is achieved. In addition, variation in the value of the frictional characteristics can be corrected by employing this invention.

SUMMARY OF THE INVENTION

In accordance with the present invention, there is provided a switching circuit for preventing the wheel velocity from exceeding the vehicle velocity in an anti-skid vehicular braking system, a first threshold stage for generating deceleration and acceleration signals, a second threshold stage for generating positive and negative slip control signals, and a logic circuit for evaluating the control signals and controlling the brake pressure; characterized by, a first switching circuit being activated by the negative slip control signal, a flip-flop being reset by a switching signal produced by the first switching circuit and being set by the positive slip control signal, a second switch circuit connected to the output of the flip-flop and controllable by the output signals for blocking the first threshold stage from generating the deceleration and acceleration control signals, and a comparator for comparing a reference velocity with the wheel velocity so that when the reference velocity is the same as the wheel velocity, the comparator generates a signal which eliminates the blocking of the first threshold stage.

DESCRIPTION OF THE DRAWINGS

The foregoing objects and other attendent features and advantages will become more readily apparent and understood as the subject invention is described in greater detail and is considered in conjunction with the accompanying drawings, wherein.

DETAILED DESCRIPTION OF THE INVENTION

Figure 1:
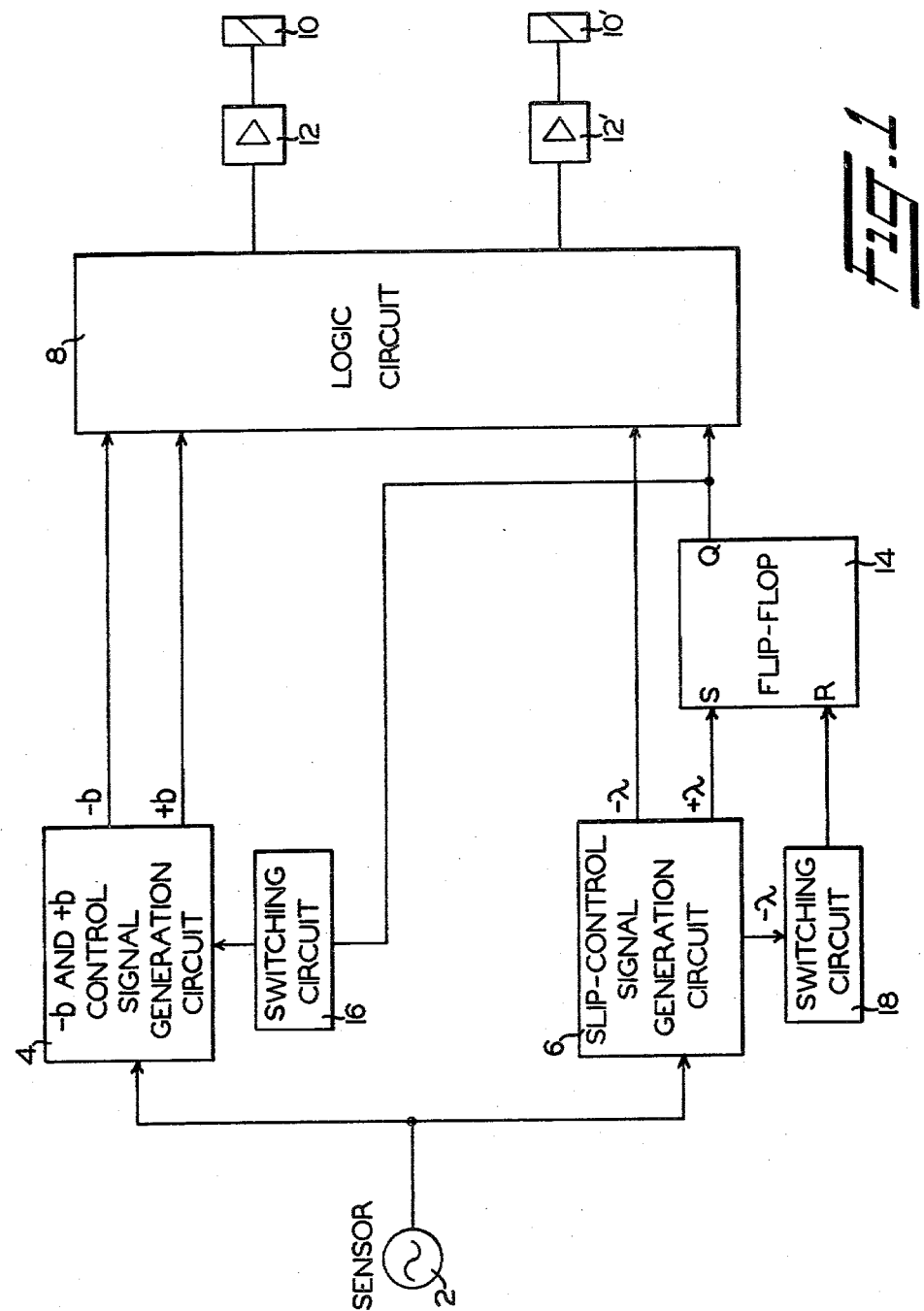
FIG. 1 illustrates a schematic block diagram of the switching circuit arrangement of the present invention.

Referring now to the drawings and, in particular, to the block diagram of FIG. 1, there is shown a suitable sensor 2. The sensor 2 may take the form of a conventional electromagnetic signal generator which senses the rotational velocity of a wheel of a moving vehicle. The signals produced by the sensor 2 are applied to a pair of threshold value stages or devices 4 and 6. Threshold stage 4 is adapted to generate a deceleration control signal $-b$ and an acceleration control signal $+b$. The second threshold slip stage 6 is adapted to generate a negative slip control signal $-\lambda$ and a positive slip control signal $+\lambda$. The control signals of both threshold stages 4 and 6 are connected and jointly applied to an appropriate logic circuit 8. The output signals from logic circuit 8 are adapted to control solenoids or magnet valves 10 and 10' which receive amplified signals from power amplifier 12 and 12', respectively.

A flip-flop or bistable multivibrator 14 is connected in line between the threshold stage 6 and the logic circuit 8. As shown, the slip control signal $+\lambda$ is applied to the set input terminal S of the flip-flop 14. The output terminal Q of the flip-flop 14 is connected to the input of the logic circuit 8 and also to a swtiching circuit or device 16. Thus, upon appearance of the slip control signal $+\lambda$, the flip-flop is set thereby activating the switching device 16 and causing the control signals $+b$ and $-b$ of the first threshold stage 4 to be blocked.

It will be seen that the slip control signal $-\lambda$ of the threshold stage 6 is applied to the input of a switching circuit or stage 18. The output of switching circuit 18 is connected to the reset input R of the flip-flop 14 and causes the flip-flop 14 to become reset when the reference velocity is equal to the wheel velocity.

Figure 2:
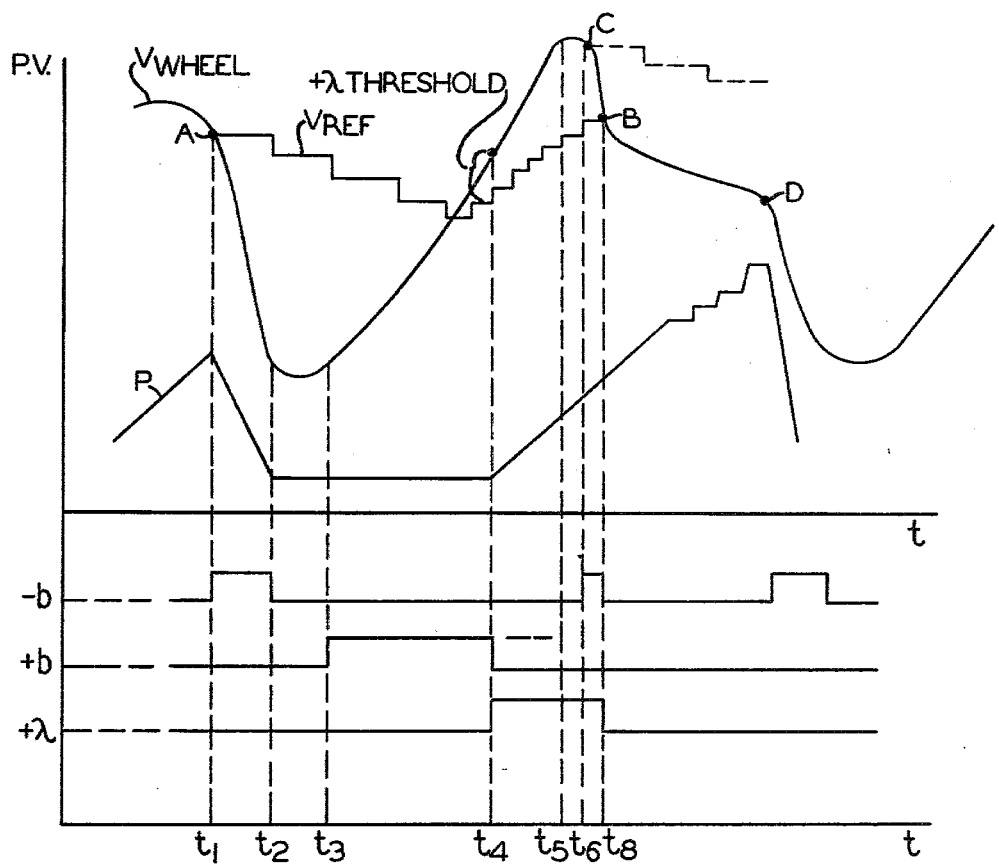
FIG. 2 shows a timing diagram illustrating the signals and control sequence achieved by the switching circuit of FIG. 1.

In analyzing the operation of the circuit of FIG. 1, it is beneficial to make reference to the curves of FIG. 2 for a better understanding of the present invention.

Let us assume that a controlled braking process is initiated. Under this condition, the wheel velocity signal $v_{wheel}$ is reduced so that when a control signal $-b$ appears at the time $t_1$, the reference velocity signal $v_{Ref}$ starts to run. As soon as a slip control signal $+\lambda$ appears after the vehicle wheel starts again at time $t_4$ wherein the wheel velocity signal $v_{wheel}$ exceeds the reference velocity signal $v_{Ref}$ by a predetermined $+\lambda$ threshold value, the flip-flop 14 is set. The output signal from terminal Q actuates the switching device 16 which blocks the generation of the acceleration and deceleration control signals $+b$ and $-b$, respectively, by the threshold circuit 4.

As shown in FIG. 2, now as soon as the slip control signal $+\lambda$ appears, brake pressure P is rapidly initiated by valves 10 and 10' for the duration of this signal. The acceleration control signal $+b$ would normally disappear at time $t_5$, and the deceleration control signal $-b$ would normally appear at the time $t_6$ after the return point C of the wheel velocity. On the basis of the switching devices of the invention, the acceleration control signal $+b$ however, is blocked at time $t_4$ and the deceleration control signal $-b$ is blocked up to point of intersection B on the velocity curves $v_{wheel}$ and $v_{Ref}$. Thus, at the time $t_8$ both of the velocities are equal. Subsequently, the flip-flop 14 is reset.

In accordance with the subject invention, there is provided a continuous adjustment of the reference period for the deceleration and acceleration control signals for causing the blocking of the deceleration control signal $-b$ up to the point of intersection of the $v_{wheel}$ and $v_{Ref}$ curves and for causing the reference velocity to run off not from point C, i.e., by time $t_6$, in which the slip control signal $-b$ would normally occur, but at a later time, namely point D.

This causes a longer rapid pressure initiation, namely until disappearance of the slip control signal $+\lambda$ instead of a pressure drop from the earlier appearance of the deceleration control signal $-b$. This prevents early setting of the reference blocking circuits, thereby preventing the velocity of the wheel $v_{wheel}$ from overshooting the vehicle velocity too far. In addition, this prevents the reference velocity from running off above the vehicle velocity. Further, the presently described circuit reliably avoids the danger of underbraking the moving vehicles.

Having now described the invention, what I claim as new and desire to secure by Letters Patent, is:

1. Switching circuit arrangement for preventing the wheel velocity from exceeding the vehicle velocity in an anti-skid vehicular braking system, a first threshold stage for generating deceleration and acceleration control signals, a second threshold stage for generating positive and negative slip control signals, and a logic circuit for evaluating the control signals controlling the brake pressure; characterized by, switching means being activated by a positive slip control signal for blocking the first threshold stage from generating the deceleration and acceleration control signals which blocking can be eliminated by the presence of a negative slip control signal.

2. A switching circuit according to claim 1, characterized in that the switching means includes a first switch circuit which is activated by the negative slip control signal, a flip-flop reset by a switching signal produced by said first switching circuit and being set by the positive slip control signal, and a second switching circuit connected to the output of the flip-flop and controllable by the output signals for blocking the first threshold stage from generating deceleration and acceleration control signals.

* * * * *